United States Patent [19]

Otobe et al.

[11] Patent Number: 4,697,421
[45] Date of Patent: Oct. 6, 1987

[54] SUPERCHARGING PRESSURE CONTROL SYSTEM FOR AN INTERNAL COMBUSTION ENGINE WITH A TUBOCHARGER AND METHOD OF OPERATION

[75] Inventors: Yutaka Otobe, Shiki; Masakatsu Niikura, Asaka; Yoshio Wazaki, Wako, all of Japan

[73] Assignee: Honda Giken Kogyo Kabushiki Kaisha, Tokyo, Japan

[21] Appl. No.: 659,575

[22] Filed: Oct. 10, 1984

[30] Foreign Application Priority Data

Oct. 13, 1983 [JP] Japan ................. 58-191277

[51] Int. Cl.⁴ ............................................ F02B 37/12
[52] U.S. Cl. ................................................... 60/602
[58] Field of Search .................. 60/600, 601, 602, 603

[56] References Cited

U.S. PATENT DOCUMENTS

| | | | |
|---|---|---|---|
| 4,136,286 | 1/1979 | O'Halloran | 415/17 X |
| 4,223,654 | 9/1980 | Wessel et al. | 123/358 |
| 4,467,607 | 8/1984 | Rydquist et al. | 60/602 |

FOREIGN PATENT DOCUMENTS

193720 11/1982 Japan ....................... 60/602

*Primary Examiner*—Michael Koczo
*Attorney, Agent, or Firm*—Lyon & Lyon

[57] ABSTRACT

A supercharging pressure control system for an internal combustion engine with a turbocharger, for controlling supercharging pressure in dependence on operating conditions of the engine, includes a waste gate valve disposed to selectively close and open a bypass exhaust passage, an actuator for actuating the waste gate valve, a control valve for communicating the actuator with the atmosphere to substantially vary the valve opening pressure of the waste gate valve, a throttle valve opening sensor, a pressure sensor for detecting intake passage pressure downstream of the throttle valve, and an electronic control unit for controlling through feedback the intake passage pressure to reach a target value by actuating the control valve in dependence on the difference between the target value and the detected pressure value. The feedback control is carried out when the throttle valve opening exceeds a predetermined value.

15 Claims, 10 Drawing Figures

SUPERCHARGING PRESSURE CONTROL SYSTEM FOR AN INTERNAL COMBUSTION ENGINE WITH A TUBOCHARGER AND METHOD OF OPERATION

BACKGROUND OF THE INVENTION

The present invention relates to a supercharging pressure control system for an internal combustion engine with a turbocharger, and more particularly to a supercharging pressure control system for accurately controlling intake passage pressure downstream of a throttle valve to a target value by controlling supercharging pressure in dependence on operating conditions of the engine while the throttle valve is opened to a wide extent.

Conventional internal combustion engines include a type including a turbocharger which is controlled by a waste gate valve. An internal combustion engine of this type is adapted such that an increased quantity of intake air is introduced into the engine cylinders by maintaining intake air pressure in the intake passage at the downstream side of a compressor of the turbocharger higher than atmospheric pressure to increase the charging efficiency of the engine and thereby increase the engine output. Further, the pressure in the intake passage is controlled by actuating the waste gate valve to selectively close and open a bypass passage or exhaust branch passage in response to the same pressure in the intake passage, thereby adjusting the flow rate of exhaust gases to be introduced into the turbine and thus the rotational speed of the turbine, that is, the compressor.

In an internal combustion engine of the type including a throttle valve disposed in an intake passage thereof at the downstream side of the compressor, the charging efficiency of the engine depends upon pressure in the intake passage at the downstream side of the throttle valve (hereinafter referred to as the $P_B$ pressure), as is well known. Therefore, it is desirable in such an engine to control the $P_B$ pressure to a desired value so as to achieve an optimum value of charging efficiency. Further, the $P_B$ pressure forms, together with intake air temperature, main factors affecting the occurrence of knocking of the engine. In order to avoid knocking of the engine as well as to achieve optimum engine output, it is necessary to regulate pressure in the intake passage at a zone downstream of the compressor and upstream of the throttle valve, that is, supercharging pressure, so as to obtain the above desired value of $P_B$ pressure, by means of the waste gate valve. Usually, the $P_B$ pressure is not greatly affected by the supercharging pressure as the throttle valve is increasingly throttled, whereas the $P_B$ pressure approaches the supercharging pressure as the opening of the throttle valve increases. By this reason, it is effective to control the supercharging pressure so as to obtain a required $P_B$ pressure value particularly when the throttle valve is opened to a wide extent.

On the other hand, a conventional supercharging pressure control system for an internal combustion engine with a turbocharger is constructed such that the supercharging pressure at the upstream side of the throttle valve is controlled by an actuator of the pneumatic type for actuating the waste gate valve simply in response to the same supercharging pressure, or such that a control valve is provided for controlling communication of the pressure chamber in such pneumatic type actuator with the atmosphere and controlled by means of other parameters than the $P_B$ pressure. Thus, the conventional supercharging control system does not employ the $P_B$ pressure as a primary control parameter, and therefore is unable to achieve optimum values of charging efficiency of the engine or output thereof properly corresponding to operating conditions of the engine.

SUMMARY OF THE INVENTION

It is therefore a primary object of the invention to provide an improved supercharging pressure control system for an internal combustion engine, which is capable of controlling the supercharging pressure with accuracy so that the $P_B$ pressure can assume values required for achieving values of engine output optimal to operating conditions of the engine, as well as for avoiding knocking of the engine.

The present invention provides a supercharging pressure control system for an internal combustion engine having an intake passage, a throttle valve arranged therein, an exhaust passage, and a turbocharger having a turbine arranged in the exhaust passage, and a compressor arranged in the intake passage. The control system comprises: a bypass exhaust passage bypassing the turbine of the turbocharger; a waste gate valve disposed for selectively closing and opening the bypass exhaust passage; an actuator for actuating the waste gate valve, the actuator having a pressure chamber and operatively connected to the waste gate valve such that a change in pressure within the pressure chamber causes displacement of the waste gate valve either in a direction of closing same or in a direction of opening same, the pressure chamber communicating with the intake passage at a location downstream of the compressor of the turbocharger and upstream of the throttle valve; a control valve for communicating the pressure chamber with the atmosphere; a first sensor for detecting the opening of the throttle valve; a second sensor for detecting pressure in the intake passage at a downstream side of the throttle valve; and electronic control means for actuating the control valve to adjust pressure in the pressure chamber to thereby control supercharging pressure in the intake passage at a downstream side of the compressor. The electronic control means is operable to control through feedback the pressure in the intake passage at the downstream side of the throttle valve to reach a target value, by actuating the control valve in dependence on the difference between the target value and the pressure value detected by the second sensor. The feedback control is carried out when the detected value of the throttle valve opening exceeds a predetermined valve opening value.

Preferably, the waste gate valve is adapted to open at a predetermined mechanical valve opening pressure when the pressure chamber of the actuator is out of communication with the atmosphere, and the target value of the intake passage pressure at the downstream side of the throttle valve is higher than a value of the intake passage pressure at the downstream side of the throttle valve corresponding to the predetermined mechanical valve opening pressure.

DETAILED DESCRIPTION

The present invention will now be described in greater detail with reference to the accompanying drawings which schematically illustrate a system in accordance with a preferred embodiment thereof.

Figure 1:
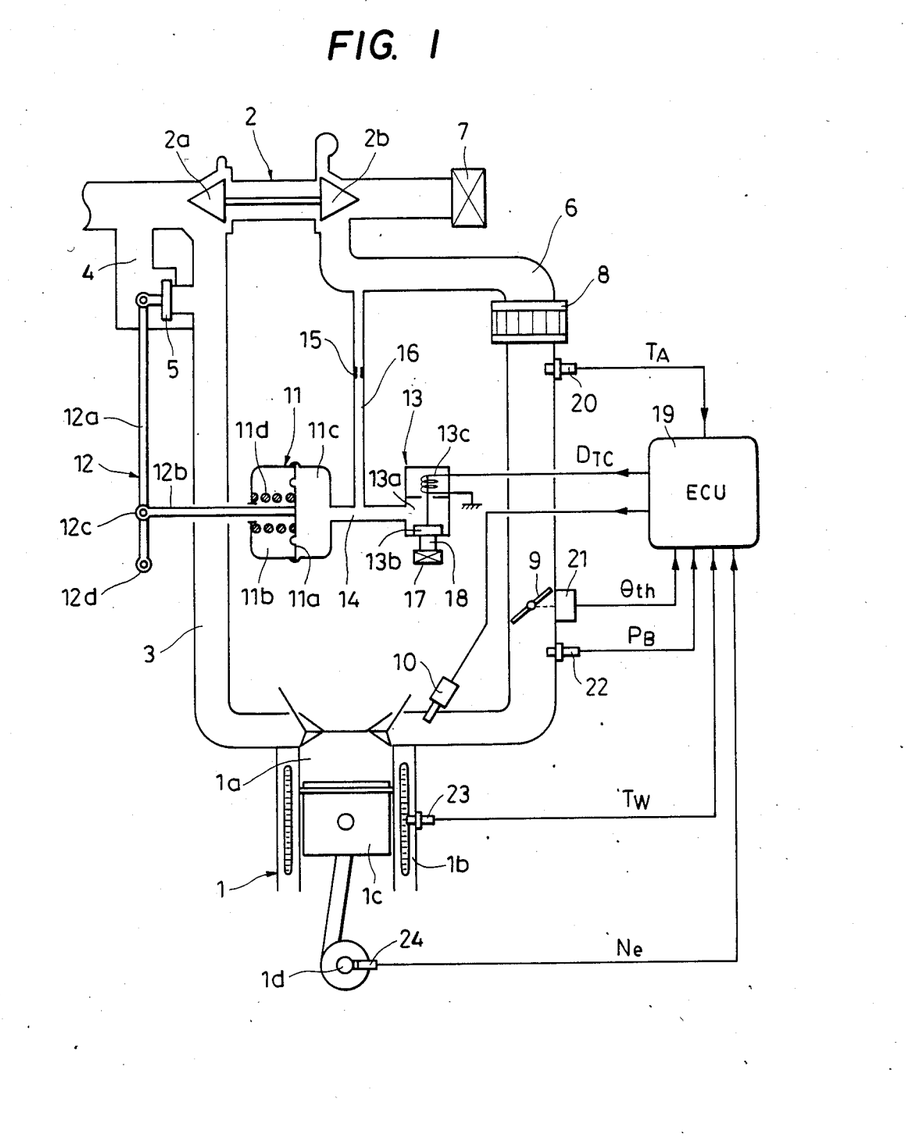
FIG. 1 is a schematic view illustrating an internal combustion engine with a turbocharger, with the control system of the present invention incorporated therein.

Referring first to FIG. 1, there is schematically illustrated an internal combustion engine 1 with the system of the present invention for controlling supercharging pressure mounted thereon, wherein the internal combustion engine 1 includes a turbocharger 2 with a turbine 2a rotatably supported therein. An exhaust passage 3 has the turbine 2a mounted therein, and a bypass exhaust passage 4 is diverged from the exhaust passage 3 at a location upstream of the turbine 2a so that the exhaust gas flow bypasses the turbine. A waste gate valve 5 is disposed to selectively close and open the bypass exhaust passage 4.

The turbocharger 2 includes a compressor 2b which is located in an intake air passage 6 (hereinafter referred to as an intake pipe) and upstream of an downstream of an air filter 7 and upstream of an intercooler 8. A throttle valve 9 is located downstream of the intercooler 8 of the intake pipe 6 and a fuel injection valve 10 is located in proximity to a combustion chamber 1a. As is apparent from the drawing, the fuel injection valve 10 is electrically connected to one of the output terminals of an electronic control unit (hereinafter referred to as the ECU) 19.

An actuator 11 for the waste gate valve 5 is constructed by a combination of atmosphere chamber 11b and pressure chamber 11c which are separated from one another by a diaphragm 11a, wherein the atmosphere chamber 11b is in communication with the atmosphere, and the diaphragm 11a is operatively connected to the waste gate valve 5 by way of a link mechanism 12. The link mechanism 12 comprises a first link 12a having a fixed fulcrum end 12d and connected at the other end to the waste gate valve 5, and a second link 12b pivotally connected at one end to an intermediate portion of the first link 12a and at the other end to the diaphragm 11a. A coil spring 11d is housed in the atmosphere chamber 11b and is compressed so as to normally urge the waste gate valve 5 in the direction of closing same, that is, thrust the diaphragm 11a toward the pressure chamber 11c. Thus, increased pressure in the pressure chamber 11c acts upon the waste gate valve through the link mechanism 12 in the direction of opening same.

The pressure chamber 11c is in communication with a valve chamber 13a of a control valve 13, via a passage 14 which is in communication, via a passage 16 with an orifice 15 fitted therein, with the intake pipe 6 at a location downstream of the compressor 2b and upstream of the intercooler 8.

Specifically, the control valve 13 is designed in the form of a normally closed frequency solenoid valve and includes a valve disc 13b in the chamber 13a which opens and closes the port on the chamber 13a. A passage 18 extends from the port so that it is in communication with the atmosphere via an air cleaner 17. A solenoid 13c of the control valve 13 is electrically connected to one of the output terminals of the ECU 19. When the solenoid 13c is energized, the control valve 13 opens against the resilient force of a return spring (not shown) and the pressure chamber 11c is brought into communication with the atmosphere via a release passage constituted by a combination of passage 14, chamber 13a, passage 18 and air cleaner 17, whereas when it is deenergized, the control valve 13 closes under the influence of the resilient force of the return spring so that communication with the atmosphere is interrupted.

Further, an intake air temperature sensor 20 is located in the intake pipe 6 downstream of the intercooler 8, a throttle valve opening sensor 21 is operatively connected to the throttle valve 9, a sensor 22 for detecting absolute pressure in the intake pipe (hereinafter referred to as the $P_B$ sensor) is located in the intake pipe 6 downstream of the throttle valve 9, an engine coolant temperature sensor 23 is mounted on the cylinder block 1b in which a water jacket is provided for the engine 1, and a sensor 24 for detecting the rotational speed of the engine is mounted on the crankshaft 1d which is connected to the piston 1c. All the sensors 20 to 24 described above are electrically connected to their corresponding input terminals of the ECU 19.

Specifically, the ECU 19 acts to determine a basic quantity of fuel injection as a function of the $P_B$ pressure and engine rotational speed (rpm) $N_e$ detected by the sensors 22 and 24 and determine a corrective quantity of fuel injection as a function of intake air temperature $T_A$, throttle valve opening $\theta_{th}$ and coolant temperature $T_W$ detected by the sensors 20, 21 and 23. Thus, a signal corresponding to the value obtained by correcting the basic quantity of fuel with the addition of the corrective quantity is transmitted to the fuel injection valve 10 whereby a proper quantity of fuel is supplied to the combustion chamber 1a corresponding to the current state of operation of the engine.

The ECU 19 carries out on-off control of the control valve 13 by determining operating conditions of the engine in response to signals detected by the sensors 20 to 24, calculating a duty ratio of valve opening for the control valve 13 and then supplying a pulse signal corresponding to the duty ratio $D_{TC}$ to the solenoid 13c to energize same. Pressure introduced into the pressure chamber 11c via the passage 16 to open the waste gate valve 5 is diluted with atmospheric pressure in dependence on the duty ratio $D_{TC}$, which is determined in correspondence to determined operating conditions of the engine, so as to regulate the opening and closing action of the waste gate valve 5 for controlling the supercharging pressure. To be specific, if it is assumed that the mechanical valve opening pressure of the waste gate valve 5, given by a combination of resilient force of the coil spring 11d and working pressure or atmospheric pressure, in the chamber 11b of the actuator 11, is set to, for instance, atmospheric pressure +500 mmHg, the valve opening pressure acting on the waste gate valve 5 can be set to any pressure substantially higher than the mechanical valve opening pressure, for instance, atmospheric pressure +580 mmHg by suitably diluting pressure in the pressure chamber 11c. Thus, the supercharging pressure can be controlled to a pressure higher than that obtainable by the mechanical valve opening pressure acting on the waste gate valve 5, dependent upon operating conditions of the engine, thereby improving the output characteristics and acceleration of the engine. It should be noted that since the $P_B$ sensor 22 is adapted to detect pressure in the intake pipe 6 in terms of absolute pressure, the $P_B$ pressure can be controlled to a desired value with accuracy irrespective of how atmospheric pressure varies in dependence on the altitude where the engine is operated, resulting in no reduction of engine output at higher elevations.

Figure 2:
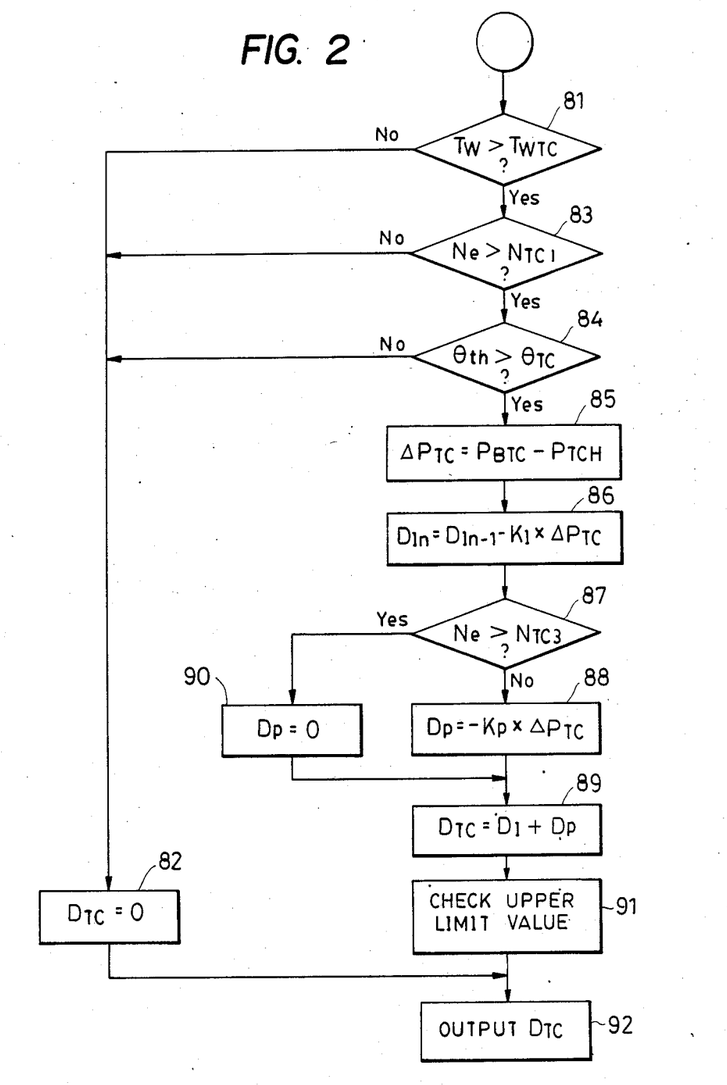
FIG. 2 is a flowchart illustrating an example of a control program for determining a valve opening duty ratio for the control valve shown in FIG. 1.

Referring to FIG. 2, there is illustrated a program for determining the duty ratio $D_{TC}$ of opening of the control valve 13, wherein the program is executed by operating a central processor in the ECU 19, which is not shown in the drawing, every time a pulse of a TDC signal is produced, representing one of predetermined angles of the crankshaft 1d, for instance, top dead center (TDC) points of the pistons, the TDC signal being supplied from the rotational speed sensor 24.

This program is first executed so as to determine whether the coolant temperature $T_W$ is higher than a predetermined temperature $T_{WTC}$ (for instance, 70° C.) (step 81). If the result of this determination is negative (No), that is, the coolant temperature $T_W$ has a temperature lower than the predetermined temperature $T_{WTC}$ and therefore warming-up has not been completed, the program proceeds to step 82 where the duty ratio $D_{TC}$ is set to zero.

On the other hand, if the result of this determination is affirmative (Yes), that is, $T_W > T_{WTC}$, and therefore warming-up has been completed, the program proceeds to step 83 to determine whether the engine rotational speed $N_e$ exceeds a predetermined lower value $N_{TC1}$ (for instance, 1,200 rpm).

If the answer to the question of step 83 is affirmative (Yes), that is, $N_e > N_{TC1}$, the program then proceeds to step 84, to determine whether the throttle valve opening $\theta_{th}$ a predetermined value $\theta_{TC}$ (for instance, 70 degrees), which is close to full opening.

If the result is negative (No), the program proceeds to step 82 to set the duty ratio $D_{TC}$ to zero.

If the result of the determination in step 84 is negative (No), that is, the throttle valve 9 opening $\theta_{th}$ is less than the predetermined value $\theta_{th}$, the program proceeds to step 82 where the duty ratio $D_{TC}$ is set to zero.

As is learned from the above, when the engine 1 is operated under any one of the following operating conditions, namely, where warming-up has not been completed or the engine 1 is rotated in a lower rotational speed region or the throttle valve 9 has a reduced valve opening, it is determined that none of conditions for controlling the waste gate valve 5 by means of the control valve 13 are fulfilled, and therefore no duty ratio control is carried out for the control valve 13. Under any of these circumstances, the opening and closing action the waste gate valve 5 takes place merely in dependence on the mechanical valve opening pressure which is determined by the force of spring 11d and atmospheric pressure in the chamber 11b of the actuator 11 and the pressure in chamber 11c counteracting the former.

If the result of determination of step 84 is affirmative (Yes), that is, the throttle valve opening $\theta_{th}$ exceeds the predetermined valve opening $\theta_{TC}$, the program proceeds to step 85.

In step 85, a deviation value $\Delta P_{TC}$ is calculated by subtracting a value $P_{TCH}$, which represents target $P_B$ pressure as hereinafter referred to, from a value $P_{BTC}$, which represents actual $P_B$ pressure detected by the $P_B$ sensor 22 when the rotational speed sensor 24 generates a pulse of the TDC signal corresponding to the present loop. It should be noted that it is preferable from the viewpoint of operational cost to employ the value of $P_{BTC}$ for step 85 as actual $P_B$ pressure to determine the aforementioned basic quantity of fuel injection, because the $P_B$ sensor 22 is usable as a common sensor.

The $P_{TCH}$ value is set at a value at which is obtained a valve opening pressure value for the waste gate valve 5 higher than the mechanical valve opening pressure value, and can be determined in the following manner in accordance with the subroutine for calculating the value $P_{TCH}$ illustrated in FIG. 3.

Figure 3:
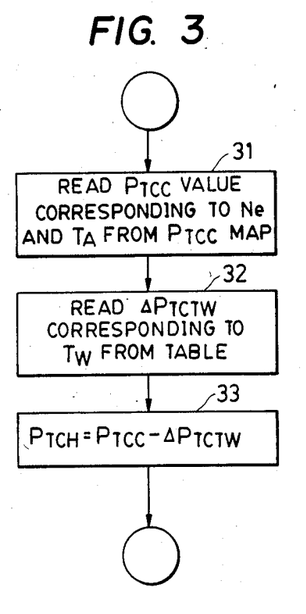
FIG. 3 is a flowchart illustrating an example of control program for determining a target value of pressure in the intake passage of the engine downstream of a throttle valve therein.

First, a $P_{TCC}$ value is read out of a $P_{TCC}$ map with reference to the engine rotational speed $N_e$ and intake air temperature $T_A$, at step 31 in FIG. 3. The $P_{TCC}$ map is prepared in the manner illustrated in the following table:

TABLE

| | TA | | | | |
|---|---|---|---|---|---|
| Ne | $T_{A1}$ | ... | $T_{Aj}$ | ... | $T_{A8}$ |
| $Ne_1$ | $P_{TCC11}$ | ... | $P_{TCC1j}$ | ... | $P_{TCC18}$ |
| . | . | | . | | . |
| . | . | | . | | . |
| . | . | | . | | . |
| $Ne_i$ | $P_{TCCi1}$ | ... | $P_{TCCij}$ | ... | $P_{TCCi8}$ |
| . | . | | . | | . |
| . | . | | . | | . |
| . | . | | . | | . |
| $Ne_8$ | $P_{TCC81}$ | ... | $P_{TCC8j}$ | ... | $P_{TCC88}$ |

Figure 4:
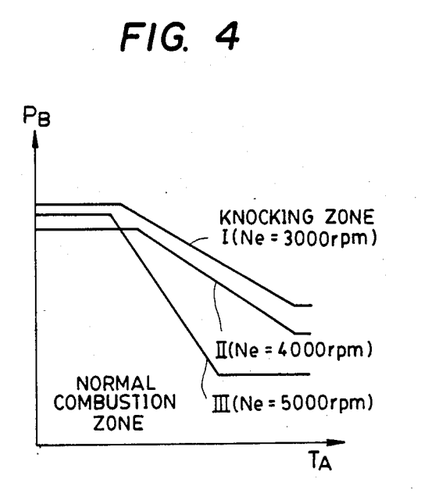
FIG. 4 is a graph depicting boundaries between knocking zones and normal combustion zones.

The values $P_{TCCij}$ (i=1 to 8, J=1 to 8) in the table are set in consideration of operating characteristics of the engine 1 such that there does not occur abnormal combustion such as knocking when the engine 1 is operated under operating conditions as defined by the corresponding engine rotational speed $N_e$ and intake air temperature $T_A$. Generally, knocking tends to occur with increased $P_B$ pressure as well as with elevated intake air temperature $T_A$, though the knocking zone varies in dependence upon operating characteristics of the engine 1 per se. FIG. 4 schematically illustrates boundaries between knocking zones and normal combustion zones. As is apparent from the drawing, boundaries I ($N_e=3,000$ rpm), II ($N_e=4,000$ rpm) and III ($N_e=5,000$ rpm) are defined by the engine rotational speed $N_e$.

Figure 5:
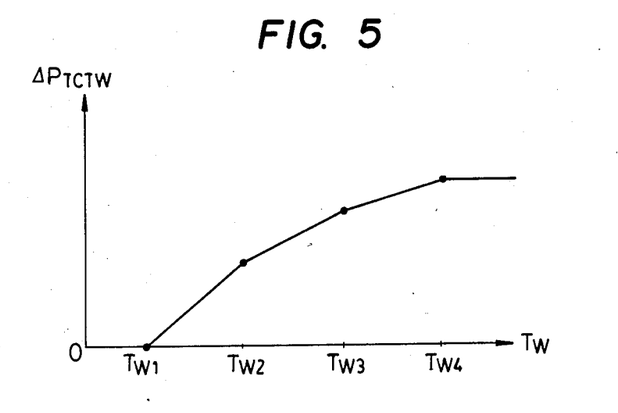
FIG. 5 is a graph for determining a corrective value of $\Delta P_{TCTW}$ for supercharging pressure to inhibit the occurrence of knocking.

Further, knocking tends to occur with elevated engine coolant temperature $T_W$. To inhibit the occurrence of knocking with elevated coolant temperature $T_W$, it is necessary to reduce the $P_{TCC}$ obtained at step 31 (see FIG. 3). To this end, an extent of reduction $\Delta P_{TCTW}$ from a $P_{TCC}$ value corresponding to coolant temperature $T_W$ is read out of the $\Delta P_{TCTW}$ table as exemplified in FIG. 5 at step 32, and the $P_{TCH}$ value ($P_{TCH}=P_{TCC}-\Delta P_{TCTW}$) is then calculated by subtracting the $\Delta P_{TCTW}$ value from the $P_{TCC}$ value read out at step 31 (see step 33 in FIG. 3).

Referring again to FIG. 2, the program proceeds to step 86 after the deviation $\Delta P_{TC}$ is calculated at step 85, wherein integration control term $D_I$ is calculated for duty ratio $D_{TC}$. That is, irtegration control term $D_{In}$ in the present loop is obtained by subtracting from integration control term $D_{In-1}$ obtained in the last loop a value $K_1 \times \Delta P_{TC}$ comprising integration coefficient $K_1$ multiplied by deviation value $\Delta P_{TC}$. The integration coefficient $K_1$ may be a constant or it may be a function of a parameter signal value which represents operating conditions of the engine 1, such as engine rotational speed (rpm) $N_e$. In the illustrated embodiment of the invention, it is assumed that when the engine rotational speed $N_e$ is less than 2,400 rpm, $K_1$ assumes a value of 0.1, and when $N_e$ exceeds 2,400 rpm, $K_1$ assumes a value of 0.2. This is attributable to the fact that the turbocharger becomes more responsive as the engine rotational speed $N_e$ increases.

After the integration control term $D_I$ is calculated at step 86, it is determined whether or not the engine rotational speed $N_e$ is higher than a predetermined higher value $N_{TC3}$ (for instance, 5,000 rpm) (step 87, FIG. 2). If the result of this determination is negative (No), that is, the engine rotational speed $N_e$ lower than the predetermined higher value $N_{TC3}$, proportion control term $D_p$ is calculated in the form of a minus value obtained from deviation value $\Delta P_{TC}$ multiplied by proportion coefficient $K_p$. The latter assumes a minus value, and it may be a constant or a function of a parameter signal value which represents operating conditions of the engine 1, such as engine rotational speed $N_e$. In the present embodiment of the invention, it is assumed that when the engine rotational speed $N_e$ is lower than 2,400 rpm, $K_p$ assumes a value of 2, and when $N_e$ exceeds 2,400 rpm, $K_p$ assumes a value of 3 in view of the fact that the turbocharger becomes more responsive as the engine rotational speed $N_e$ increases.

Next, the program proceeds to step 89 to calculate the valve opening duty ratio $D_{TC}$ for the control valve 13 by summing the integration control term $D_I$ and proportion control term $D_p$.

If the answer to step 87 is affirmative (Yes), that is, the engine rotational speed $N_e$ is higher than the predetermined higher value $N_{TC3}$, the proportion control term $D_p$ is set to zero without step 88 being executed (step 90, FIG. 2). Thereafter, the program proceeds to step 89.

The reason why no proportion control is carried out when the engine 1 is rotated at a higher rotational speed is as follows. In feedback control, both the integration term $D_I$ and the proportion term $D_p$ have the same sign, and therefore the control system becomes highly responsive or sensitive when control is carried out with summation of both terms $(D_I + D_p)$, because the control amount, i.e. the rate of change in the $P_B$ pressure is large. As a result, when the control system is excessively responsive in the higher rotational speed area, the supercharging pressure, that is, the $P_B$ pressure, fluctuates violently, causing the engine rotational speed to become unstable. For this reason, control is carried out only with integration term $D_I$ in the higher rotational speed area so as to restrain the sensitiveness of the control system.

Figure 6:
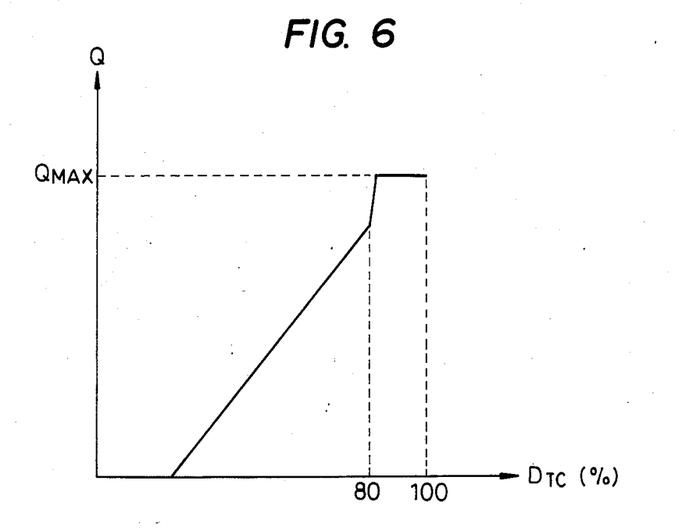
FIG. 6 is a graph depicting the characteristics of flow rate of the control valve shown in FIG. 1.
Figure 7:
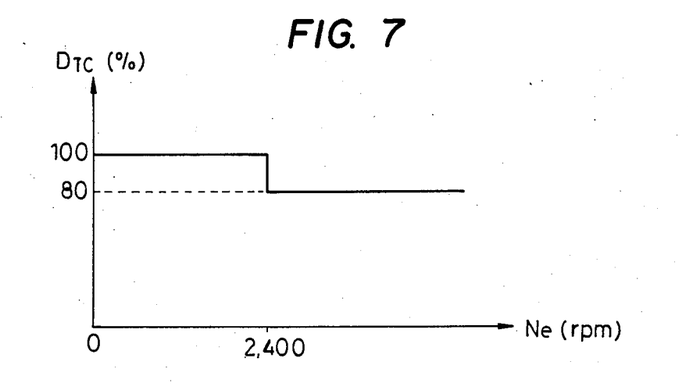
FIG. 7 is a graph for determining the upper limit value of the valve opening duty ratio for the control valve shown in FIG. 1.

After the duty ratio $D_{TC}$ for opening the control valve 13, having flow rate characteristics as illustrated in FIG. 6, is calculated in step 89, limit checking is carried out for duty ratio $D_{TC}$ in step 91, with reference to an upper limit table for duty ratio $D_{TC}$ as depicted in FIG. 7.

Specifically, if it is found that duty ratio $D_{TC}$ calculated in step 89 exceeds 80% when the engine rotational speed $N_e$ is higher than a predetermined value, which is 2,400 rpm in the present embodiment, the duty ratio $D_{TC}$ is reset to 80%. This is because of the fact that as the duty ratio $D_{TC}$ increases, the flow rate of the control valve 13 increases in the controlled manner as indicated in FIG. 6 until a duty ratio $D_{TC}$ of 80% is achieved, but when the duty ratio $D_{TC}$ exceeds 80%, the flow rate abruptly increases presenting considerable difficulty in carrying out precise control.

If duty ratio $D_{TC}$ calculated in step 89 exceeds 100% when the engine rotational speed $N_e$ is lower than 2,400 rpm, the duty ratio $D_{TC}$ is reset to 100% to prevent the control valve 13 from incorrectly functioning, and also due to the fact that while the engine 1 is operated at a lower rotational speed than 2,400 rpm, the supercharging pressure increases little even when the duty ratio $D_{TC}$ is set to 100%.

After the valve opening duty ratio $D_{TC}$ calculated in step 89, and the upper limit value of duty ratio $D_{TC}$ is checked in step 91 or the duty ratio $D_{TC}$ is set to zero in step 82, step 92 is executed to open the control valve 13 according to duty ratio $D_{TC}$ determined in dependence on operating conditions of the engine 1 as described above, whereby the valve opening pressure active on the waste gate valve 5 is controlled in dependence on operating conditions of the engine 1.

Figure 8:
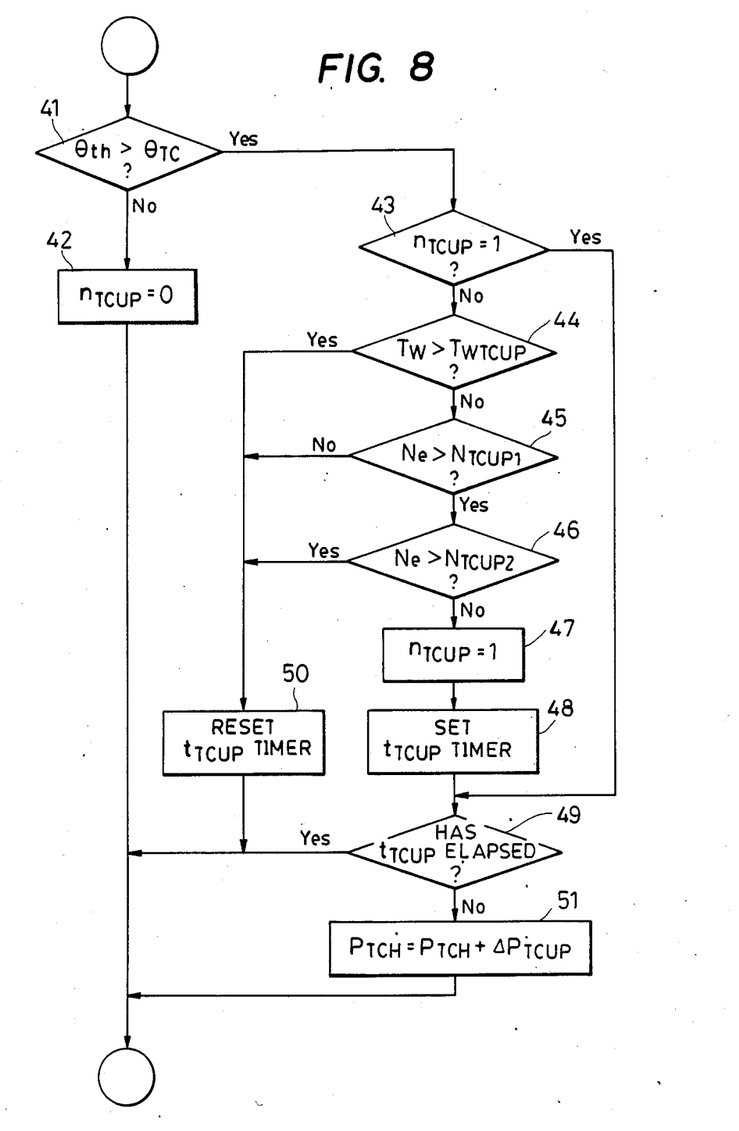
FIG. 8 is a flow chart depicting a control program for temporarily increasing target $P_B$ pressure.

Referring now to FIG. 8, a flow chart is depicted illustrating a control program for increasing the value of $P_{TCH}$ for a predetermined period of time, which is 10 seconds in the illustrated embodiment of the invention for instance, when the engine 1 is rotated under a predetermined operating condition. The control program illustrated in FIG. 8 as well as those in FIGS. 2 and 3 are executed every time a pulse of the TDC signal is generated.

In the program set forth in FIG. 8, it is first determined, as in step 84 illustrated in FIG. 2, whether the opening $\theta_{th}$ of the throttle valve 9 is larger than the aforementioned predetermined value $\theta_{TC}$ (for instance, 70 degrees) (step 41). If the result of this determination is negative (No), that is, the throttle valve opening $\theta_{th}$ is smaller than the predetermined value $\theta_{TC}$, step 88 of the program depicted in FIG. 2 is not executed, and therefore there is no necessity for increasing the value of $P_{TCH}$. Step 42 is then executed where the value of flag $n_{TCUP}$ is set to zero, to thus terminate execution of the program of FIG. 8.

If the result of determination of step 41 is affirmative (Yes), that is, the throttle valve opening $\theta_{th}$ is larger than the predetermined value $\theta_{TC}$, it is then determined whether the value of flag $n_{TCUP}$ is 1 (step 43).

When the engine 1 is rotated under the aforementioned predetermined condition, that is, the coolant temperature $T_W$ is lower than a predetermined value $T_{WTCUP}$ (for instance, 96° C.) and the engine rotational speed $N_e$ is maintained within a predetermined range (for instance, 2,500 rpm $\leq N_e \leq$ 4,000 rpm), the value of flag $n_{TCUP}$ is set to a value of 1 in step 47.

If the result of the determination of step 43 is negative (No), that is, $n_{TCUP} = 0$, namely, when the throttle valve opening $\theta_{th}$ becomes higher than the predetermined value $\theta_{TC}$ for the first time upon generation of a pulse of the TDC signal corresponding to the present loop, the program proceeds to step 44. In step 44 it is determined whether the coolant temperature $T_W$ is higher than the predetermined value $T_{WTCUP}$. If the result of this determination is negative (No), that is, $T_W \leq T_{WTCUP}$, the program proceeds to step 45.

In step 45 it is determined whether the engine rotational speed $N_e$ is higher than the first predetermined value $N_{TCUP1}$ (for instance, 2,500 rpm). If the result of this determination is affirmative (Yes), that is, $N_e > N_{TCUP1}$, the program proceeds to step 46.

In step 46 it is determined whether the engine rotational speed $N_e$ is higher than the second predetermined value $N_{TCUP2}$ (for instance, 4,000 rpm), which is higher than the first predetermined value $N_{TCUP1}$. If the result of this determination is negative (No), that is, $N_e \leq N_{TCUP2}$, the program proceeds to step 47, where the value of $n_{TCUP}$ is set to a value of 1. The program then proceeds to step 48. In step 48 the $t_{TCUP}$ timer has its count value set to an initial value of zero so that the timer starts its operation. The program then proceeds to step 49.

If the result of determination of step 43 is affirmative (Yes), that is, $n_{TCUP} = 1$, the program proceeds directly to step 49, jumping steps 44 to 48.

In step 49 it is determined whether the predetermined period of time $t_{TCUP}$ (for instance, 10 seconds) has elapsed after the timer has started its operation. If the result of this determination is affirmative (Yes), that is, the predetermined period of time $t_{TCUP}$ has elapsed since the starting of the timer, the program as illustrated in FIG. 8 is considered to be fully executed and step 51 is not executed.

If the result obtained at step 44 is affirmative (Yes), or the result obtained at step 45 is negative (No) or the result obtained at step 46 is affirmative (Yes), that is, when it is determined that the engine is not operating under the aforesaid predetermined operating condition, the $t_{TCUP}$ timer is reset (step 50). At this point, the program as illustrated in FIG. 8 has been fully executed.

If the result obtained at step 49 is negative (No), that is, the predetermined period of time $t_{TCUP}$ has not elapsed since the starting of the timer, the program proceeds to step 51 to add a predetermined value $\Delta P_{TCUP}$ (for instance, 50 mm Hg) to the value of $P_{TCH}$ obtained at step 33, resulting in a new value of $P_{TCH}$. At this point, the program as illustrated in FIG. 8 has been fully executed.

As stated above, step 51 is continually executed until the predetermined period of time $t_{TCUP}$ elapses so long as the engine is operating in the predetermined operating condition while the throttle valve opening $\theta_{th}$ is greater than the predetermined value $\theta_{TC}$. Thus, the value of $P_{TCH}$ represents target $P_B$ pressure is increased by the predetermined value $P_{TCUP}$ and, thereafter, steps 85 and 88 in FIG. 2 are executed by the use of the increased value of $P_{TCH}$, resulting in improved acceleration performance of the engine 1.

Figure 9:
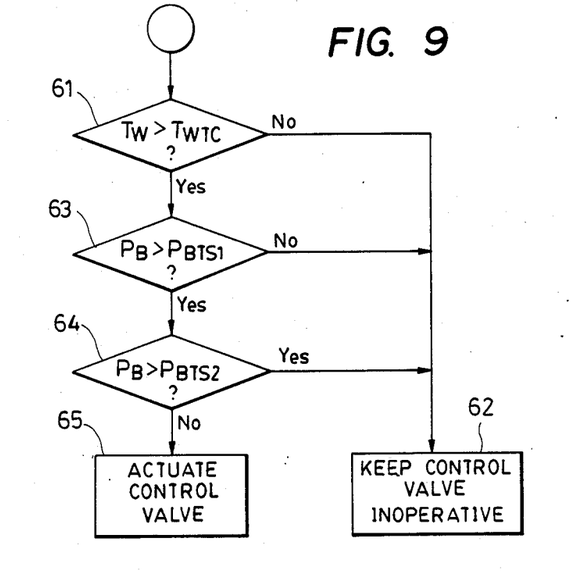
FIG. 9 is a flowchart of a control program for forcibly actuating the control valve shown in FIG. 1 at partial load operation of the engine.
Figure 10:
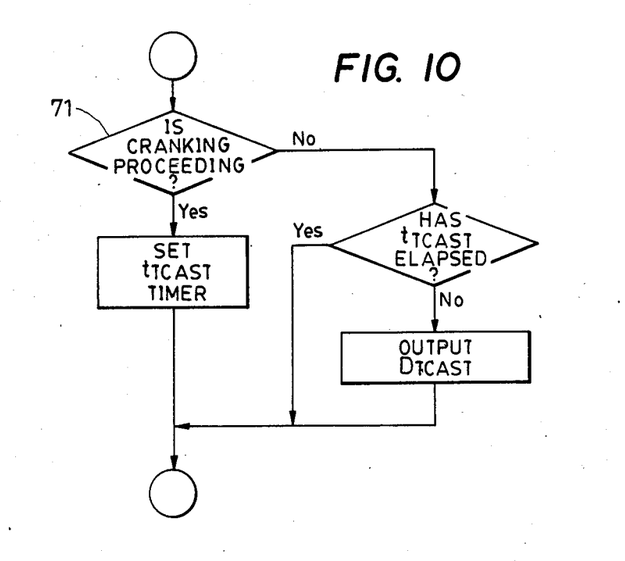
FIG. 10 is a flowchart of a control program for forcibly actuating the control valve at the start of the engine.

Referring now to FIGS. 9 and 10, flow charts are presented illustrating control programs for protecting the control valve 13 (to prevent the control valve 13 from being immovable) by forcibly actuating it when it fails to be actuated in accordance with the control program illustrated in FIG. 2.

As described above, on-off operation of the normally closed control valve 13 is initiated only when the throttle valve opening $\theta_{th}$ exceeds the predetermined value $\theta_{TC}$ (for instance, 70 degrees). Thus, when the engine 1 is rotated for a long time under such operating conditions that the inequality $\theta_{th} > \theta_{TC}$ is not established, for instance, when a car with the engine 1 mounted thereon is driven across a large city area, there is a fear that a valve disc in the control valve 13 will be immovable when the valve is to be actuated because it has been closed for a long time and thereby the valve disc is firmly stuck on the valve seat under the influence of pressure of blow-by gas or a like medium. There is thus a necessity for forcibly actuating the control valve 13 in the following manner.

Specifically, FIG. 9 schematically illustrates an example of a control program for forcibly actuating the control valve 13 when the engine is rotated under predetermined operating conditions (for instance, where $T_W > 70°$ C. and 360 mm Hg $< P_B \leq 660$ mm Hg while the waste gate valve 5 is closed, that is, the engine 1 is operating in a partial load condition.

In this program it is first determined whether the coolant temperature $TW_W$ is higher than a predetermined value $T_{WTC}$ (for instance, 70° C.) (step 61). If the result of this determination is negative (No), that is, $T_W \leq T_{WTC}$, the program proceeds to step 62 so that the control valve 13 remains in the inoperative state (normally closed state). On the other hand, if the result obtained at step 61 is affirmative (Yes), that is, $T_W > T_{WTC}$, the program proceeds to step 63.

In step 63 it is determined whether the PB pressure is higher than the first predetermined value $P_{BTS1}$ (for instance, 360 mm Hg). If the result of this determination is negative (No), that is, $P_B \leq P_{BTS1}$, the program proceeds to step 62. On the other hand, if the result of this determination is affirmative (Yes), that is, $P_B > P_{BTS1}$, the program proceeds to step 64.

In step 64 it is determined whether the $P_B$ pressure is higher than the second predetermined value $P_{BTS2}$ (for instance, 660 mm Hg). If the result of this determination is affirmative (Yes), that is, $P_B > P_{BTS2}$, the program proceeds to step 62. On the other hand, if the result of this determination is negative (No), that is, $P_B \leq P_{BTS2}$, where the engine 1 carries a partial load, step 65 is executed to bring the control valve 13 into the operative state at a predetermined duty ratio.

In the illustrated embodiment of FIG. 9, detection as to whether the current operating state of the engine meets the predetermined conditions is effected by using the $P_B$ pressure. However, the present invention is not limited only to use of this parameter. Alternatively, detection may be effected by employing throttle valve opening $\theta_{th}$.

FIG. 10 schematically illustrates an example of a control program for forcibly actuating the control valve 13 when the engine 1 starts its operation.

In this program, it is first determined whether the engine 1 is in the cranking state (step 71). If the result of this determination is affirmative (Yes), that is, the engine 1 is in the cranking state, the count value of a $t_{TCAST}$ timer is set to an initial value of zero, and operation of the timer is initiated (step 72). At this point, the program as illustrated in FIG. 10 has been fully executed.

If the result obtained at step 71 is negative (No), that is, the engine 1 is not in the cranking state, step 73 is executed to determine whether a predetermined period of time $t_{TCAST}$ (for instance, 2 seconds) has elapsed after the count value of the $t_{TCAST}$ timer was set to the initial value of 0, just before the engine 1 is brought out of the cranking state.

If it is determined at step 73 that the predetermined period of time $t_{TCAST}$ has elapsed after the engine 1 is brought out of the cranking state, the program as illustrated in FIG. 10 is considered to have been fully executed and step 74 is not executed.

If it is determined at step 73 that the predetermined period of time $t_{TCAST}$ has not elapsed after the engine 1 is brought out of the cranking state, the program proceeds to step 74, where an electric signal corresponding to a predetermined valve opening duty ratio $D_{TCAST}$ (for instance, 50%) is outputted to the control valve 13 to actuate same. At this point, the program illustrated in FIG. 10 has been fully executed.

Thus, according to the illustrated embodiment, the control valve 13 is actuated at the predetermined duty ratio $D_{TCAST}$ for two seconds after the engine 1 is brought out of the cranking state. Both of the control programs of FIGS. 9 and 10 need not be employed for prevention of adherence of the control valve 13 to the valve seat, but only one of the two programs may be employed.

While the invention as described hereinabove represents the preferred embodiments of the present invention, it will be understood that the invention is not limited to those particular embodiments. On the contrary, it is intended to cover all variations, alternatives, modifications, and equivalents thereof, as may be included within the spirit and scope of the invention as defined by the appended claims.

What is claimed is:

1. A supercharging pressure control system for an internal combustion engine having an intake passage, a throttle valve arranged therein, an exhaust passage, a turbocharger having a turbine arranged in said exhaust passage, and a compressor arranged in said intake passage, comprising: a bypass exhaust passage bypassing said turbine of said turbocharger; a waste gate valve disposed for selectively closing and opening said bypass exhaust passage; an actuator for actuating said waste gate valve, said actuator having a pressure chamber and being operatively connected to said waste gate valve such that a change in pressure within said pressure chamber causes displacement of said waste gate valve either in a direction of closing same or in a direction of opening same, said pressure chamber communicating with said intake passage at a location downstream of said compressor of said turbocharger and upstream of said throttle valve; a control valve for communicating said pressure chamber with the atmosphere; a first sensor for detecting the opening of said throttle valve; a second sensor for detecting pressure in said intake passage at a downstream side of said throttle valve; and electronic control means for actuating said control valve to adjust the pressure in said pressure chamber to thereby control supercharging pressure in said intake passage at a downstream side of said compressor, said electronic control means being operable to control through feedback the pressure in said intake passage at the downstream side of said throttle valve to reach a target value, by actuating said control valve in dependence on the difference between said target value and the pressure value detected by said second sensor, said feedback control being carried out when the detected value of said throttle valve opening exceeds a predetermined valve opening value,
   wherein said electronic control means includes means for calculating a valve opening duty ratio in accordance with the sum of an integration term and a proportion term corresponding to the difference between said target value and the detected value of said intake passage pressure at the downstream side of said throttle valve, and means for actuating said control valve at the calculated duty ratio,
   wherein said integration term includes an integration coefficient having a value variable in dependence on the rotational speed of said engine.

2. A supercharging pressure control system for an internal combustion engine having an intake passage, a throttle valve arranged therein, an exhaust passage, a turbocharger having a turbine arranged in said exhaust passage, and a compressor arranged in said intake passage, comprising: a bypass exhaust passage bypassing said turbine of said turbocharger; a waste gate valve disposed for selectively closing and opening said bypass exhaust passage; an actuator for actuating said gate valve, said actuator having a pressure chamber and being operatively connected to said waste gate valve such that a change in pressure within said pressure chamber causes displacement of said waste gate valve either in a direction of closing same or in a direction of opening same, said pressure chamber communicating with said intake passage at a location downstream of said compressor of said turbocharger and upstream of said throttle valve; a control valve for communicating said pressure chamber with the atmosphere; a first sensor for detecting the opening of said throttle valve; a second sensor for detecting pressure in said intake passage at a downstream side of said throttle valve; and electronic control means for actuating said control valve to adjust the pressure in said pressure chamber to thereby control supercharging pressure in said intake passage at a downstream side of said compressor, said electronic control means being operable to control through feedback the pressure in said intake passage at the downstream side of said throttle valve to reach a target value, by actuating said control valve in dependence on the difference between said target value and the pressure value detected by said second sensor, said feedback control being carried out when the detected value of said throttle valve opening exceeds a predetermined valve opening value,
   wherein said electronic control means includes means for calculating a valve opening duty ratio in accordance with the sum of an integration term and a proportion term corresponding to the difference between said target value and the detected value of said intake passage pressure at the downstream side of said throttle valve, and means for actuating said control valve at the calculated duty ratio,
   wherein said proportion term includes a proportion coefficient having a value variable in dependence on the rotational speed of said engine.

3. A supercharging pressure control system for an internal combustion engine having an intake passage, a throttle valve arranged therein, an exhaust passage, a turbocharger having a turbine arranged in said exhaust passage, and a compressor arranged in said intake passage, comprising: a bypass exhaust passage bypassing said turbine of said turbocharger; a waste gate valve disposed for selectively closing and opening said bypass exhaust passage; an actuator for actuating said waste gate valve, said actuator having a pressure chamber and being operatively connected to said waste gate valve such that a change in pressure within said pressure chamber causes displacement of said waste gate valve either in a direction of closing same or in a direction of opening same, said pressure chamber communicating with said intake passage at a location downstream of said compressor of said turbocharger and upstream of said throttle valve; a control valve for communicating said pressure chamber with the atmosphere; a first sensor for detecting the opening of said throttle valve; a second sensor for detecting pressure in said intake passage at a downstream side of said throttle valve; and electronic control means for actuating said control valve to adjust the pressure in said pressure chamber to thereby control supercharging pressure in said intake passage at a downstream side of said ocmpressor, said electronic control means being operable to control through feedback the pressure in said intake passage at the downstream side of said throttle valve to reach a target value, by actuating said control valve in dependence on the difference between said target value and the pressure value detected by said second sensor, said feedback control being carried out when the detected value of said throttle valve opening exceeds a predetermined valve opening value,     wherein said electronic control means includes means for calculating a valve opening duty ratio in accordance with the sum of an integration term and a proportion term corresponding to the difference between said target value and the detected value of said intake passage pressure at the downstream side of said throttle valve, and means for actuating said control valve at the calculated duty ratio,     wherein said electronic control means includes means for setting the value of said proportion term to zero to thereby inhibit said valve opening duty ratio from being controlled by proportional control when the rotational speed of said engine is higher than a predetermined value.

4. The supercharging pressure control system as claimed in any one of claims 1 to 3, wherein said waste gate valve is adapted to open at a predetermined mechanical valve opening pressure when said pressure chamber of said actuator is out of communication with the atmosphere, said target value of said intake passage pressure at the downstream side of said throttle valve being higher than a value of said intake passage pressure at the downstream side of said throttle valve corresponding to said predetermined mechanical valve opening pressure.

5. The supercharging pressure control system as claimed in any one of claims 1 to 3, wherein said second sensor is adapted to detect said intake passage pressure at the downstream side of said throttle valve in terms of absolute pressure.

6. The supercharging pressure control system as claimed in any one of claims 1 to 3, wherein said integration term includes an integration coefficient having a constant value.

7. The supercharging pressure control system as claimed in any one of claims 1 to 3, wherein said proportion term includes a proportion coefficient having a constant value.

8. The supercharging pressure control system as claimed in any one of claims 1 to 3, wherein said control valve comprises a normally closed type frequency solenoid valve.

9. The supercharging pressure control system as claimed in claim 8, wherein said electronic control means includes means for forcibly opening said frequency solenoid valve when said engine is operated under partial load.

10. The supercharging pressure control system as claimed in claim 8, wherein said electronic control means includes means for forcibly opening said frequency solenoid valve when said engine starts its operation.

11. The supercharging pressure control system as claimed in claim 8, wherein said electronic control means includes means for setting an upper limit value of a valve opening duty ratio at which said frequency solenoid valve is controlled in a manner variable as a function of the rotational speed of said engine.

12. The supercharging pressure control system as claimed in claim 11, wherein the upper limit value set when the rotational speed of said engine is higher than a predetermined value is less than that set when the rotational speed of said engine is lower than said predetermined value.

13. A method of controlling an internal combustion engine including an intake passage, a throttle valve arranged therein, an exhaust passage, a turbocharger having a turbine arranged in said exhaust passage, and a compressor arranged in said intake passage, a bypass exhaust passage bypassing said turbine of said turbocharger; a waste gate valve disposed for selectively closing and opening said bypass exhaust passage; an actuator for actuating said waste gate valve, said actuator having a pressure chamber and being operatively connected to said waste gate valve such that a change in pressure within said pressure chamber causes displacement of said waste gate valve either in a direction of closing same or in a direction of opening same, said pressure chamber communicating with said intake passage at a location downstream of said compressor of said turbocharger and upstream of said throttle valve; a control valve for communicating said pressure chamber with the atmosphere, wherein said control valve is actuated to adjust the pressure in said pressure chamber to thereby control supercharging pressure in said intake passage at a downstream side of said compressor, the metbod comprising: detecting the opening of said throttle valve; detecting the pressure in said intake passage at a downstream side of said throttle valve; and controlling through feedback the pressure in said intake passage at the downstream side of said throttle valve to reach a target value by actuating said control valve in dependence on the difference between the target value and the detected pressure value, said feedback control being carried out when the detected throttle valve opening exceeds a predetermined value,     wherein said electronic control means includes means for calculating a valve opening duty ratio in accordance with the sum of an integration term and a proportion term corresponding to the difference between said target value and the detected value of said intake passage pressure at the downstream side of said throttle valve, and means for actuating said control valve at the calculated duty ratio,     wherein said integration term includes an integration coefficient having a value variable in dependence on the rotational speed of said engine.

14. A method of controlling an internal combustion engine including an intake passage, a throttle valve arranged therein, an exhaust passage, a turbocharger having a turbine arranged in said exhaust passage, and a compressor arranged in said intake passage, a bypass exhaust passage bypassing said turbine of said turbocharger; a waste gate valve disposed for selectively closing and opening said bypass exhaust passage; an actuator for actuating said waste gate valve, said actuator having a pressure chamber and being operatively connected to said waste gate valve such that a change in pressure within said pressure chamber causes displacement of said waste gate valve either in a direction of closing same or in a direction of opening same, said pressure chamber communicating with said intake passage at a location downstream of said compressor of said turbocharger and upstream of said throttle valve; a control valve for communicating said pressure chamber with the atmosphere, wherein said control valve is actuated to adjust the pressure in said pressure chamber to thereby control supercharging pressure in said intake passage at a downstream side of said compressor, the method comprising: detecting the opening of said throttle valve; detecting the pressure in said intake passage at a downstream side of said throttle valve; and controlling through feedback the pressure in said intake passage at the downstream side of said throttle valve to reach a target value by actuating said control valve in dependence on the difference between the target value in dependence on the difference batween the target value and the detected pressure value, said feedback control being carried out when the detected throttle valve opening exceeds a predetermined value,
  wherein said electronic control means includes means for calculating a valve opening duty ratio in accordance with the sum of an integration term and a proportion term corresponding to the difference between said target value and the detected value of said intake passage pressure at the downstream side of said throttle valve, and means for actuating said control at the calculated duty ratio,
  wherein said proportion term includes a proportion coefficient having a value variable in dependence on the rotational speed of said engine,

15. A method of controlling an internal combustion engine including an intake passage, a throttle valve arranged therein, an exhaust passage, a turbocharger having a turbine arranged in said exhaust passage, and a compressor arranged in said intake passage, a bypass exhaust passage bypassing said turbine of said turbocharger; a waste gate valve disposed for selectively closing and opening said bypass exhaust passage; and actuator for actuating said waste gate valve, said actuator having a pressure chamber and being operatively connected to said waste gate valve such that a change in pressure within said pressure chamber causes displacement of said waste gate valve either in a direction of closing same or in a direction of opening same, said pressure chamber communicating with said intake passage at a location downstream of said compressor of said turbocharger and upstream of said throttle valve; a control valve for communicating said pressure chamber with the atmosphere, wherein said control valve is actuated to adjust the pressure in said pressure chamber to thereby control supercharging pressure in said intake passage at a downstream side of said compressor, the method comprising: detecting the opening of said throttle valve; detecting the pressure in said intake passage at a downstream side of said throttle valve; and controlling through feedback the pressure in said intake passage at the downstream side of said throttle valve to reach a target value by actuating said control valve in dependence on the difference between the target and the detected pressure value, said feedback control being carried out when the detected throttle valve opening exceeds a predetermined value,
  wherein said electronic control means includes means for calculating a valve opening duty ratio in accordance with the sum of an integration term and a proportion term corresponding to the difference between said target value and the detected value of said intake passage pressure at the downstream side of said throttle valve, and means for actuating said control valve at the calculated duty ratio,
  wherein said electronic control means includes means for setting the value of said proportion term to zero to thereby inhibit said valve opening duty ratio from being controlled by proportional control when the rotational speed of said engine is higher than a predetermined value.

* * * * *